United States Patent
Bowling

(10) Patent No.: US 6,661,344 B2
(45) Date of Patent: Dec. 9, 2003

(54) ELECTRONIC IDENTIFICATION SYSTEM

(76) Inventor: Michael Bowling, 1529-108th Ave., Otsego, MI (US) 49078-9779

( * ) Notice: Subject to any disclaimer, the term of this patent is extended or adjusted under 35 U.S.C. 154(b) by 0 days.

(21) Appl. No.: 09/813,753

(22) Filed: Mar. 21, 2001

(65) Prior Publication Data

US 2002/0135487 A1 Sep. 26, 2002

(51) Int. Cl.$^7$ .................................. G08B 23/00
(52) U.S. Cl. .......................... 340/573.3; 340/573.1; 340/693.5; 119/859
(58) Field of Search .................. 340/573.3, 573.1, 340/692, 691.8, 693.5, 384.1, 384.7, 387.1, 391.1, 693.7, 693.12, 572.8; 119/856, 857, 858, 859

(56) References Cited

U.S. PATENT DOCUMENTS

| | | | |
|---|---|---|---|
| 4,480,589 A | * 11/1984 | Schneider | 119/106 |
| 5,012,229 A | 4/1991 | Lennon et al. | 345/1.1 |
| 5,337,041 A | 8/1994 | Friedman | 340/573.1 |
| 5,355,839 A | 10/1994 | Mistry | 119/858 |
| 5,396,544 A | 3/1995 | Gilbert et al. | 379/67 |
| 5,454,350 A | 10/1995 | Betheil | 119/858 |
| 5,515,033 A | 5/1996 | Matarazzo | 340/573.3 |
| 5,752,335 A | * 5/1998 | Shimogori et al. | 40/300 |
| 5,894,275 A | * 4/1999 | Swingle | 340/692 |
| 5,955,953 A | 9/1999 | Hanson et al. | 340/573.3 |
| 5,973,250 A | * 10/1999 | Zirille et al. | 84/600 |
| 6,003,473 A | * 12/1999 | Printz | 119/859 |
| 6,028,752 A | * 2/2000 | Chomette et al. | 360/137 |
| 6,064,307 A | * 5/2000 | Silver | 340/573.1 |
| 6,067,018 A | 5/2000 | Skelton et al. | 340/573.3 |
| 6,239,700 B1 | 5/2001 | Hoffman et al. | 340/539 |
| 6,329,918 B1 | * 12/2001 | Moyer | 340/573.1 |
| 6,369,698 B1 | * 4/2002 | Valente | 340/309.15 |
| 6,374,778 B1 | * 4/2002 | Glussich | 119/859 |

OTHER PUBLICATIONS

PCT International Search Report, Mar. 29, 2002 (PCT/US01/16826).

* cited by examiner

Primary Examiner—Toan Pham
(74) Attorney, Agent, or Firm—Price, Heneveld, Cooper, DeWitt & Litton

(57) ABSTRACT

A portable, self-contained identification system comprises a base, a removable lid operatively and sealingly engageable with the base, whereby the removable lid and the base cooperate to form a sealed enclosure when the removable lid is engaged with the base. A recording device has a record microphone and a record switch and the playback device has a speaker and a playback switch. The recording switch is manually actuated to record the message and a playback switch is actuated by the depression and the release of the playback button, such that the playback switch is automatically actuated by removal of the removable lid to playback the message.

20 Claims, 6 Drawing Sheets

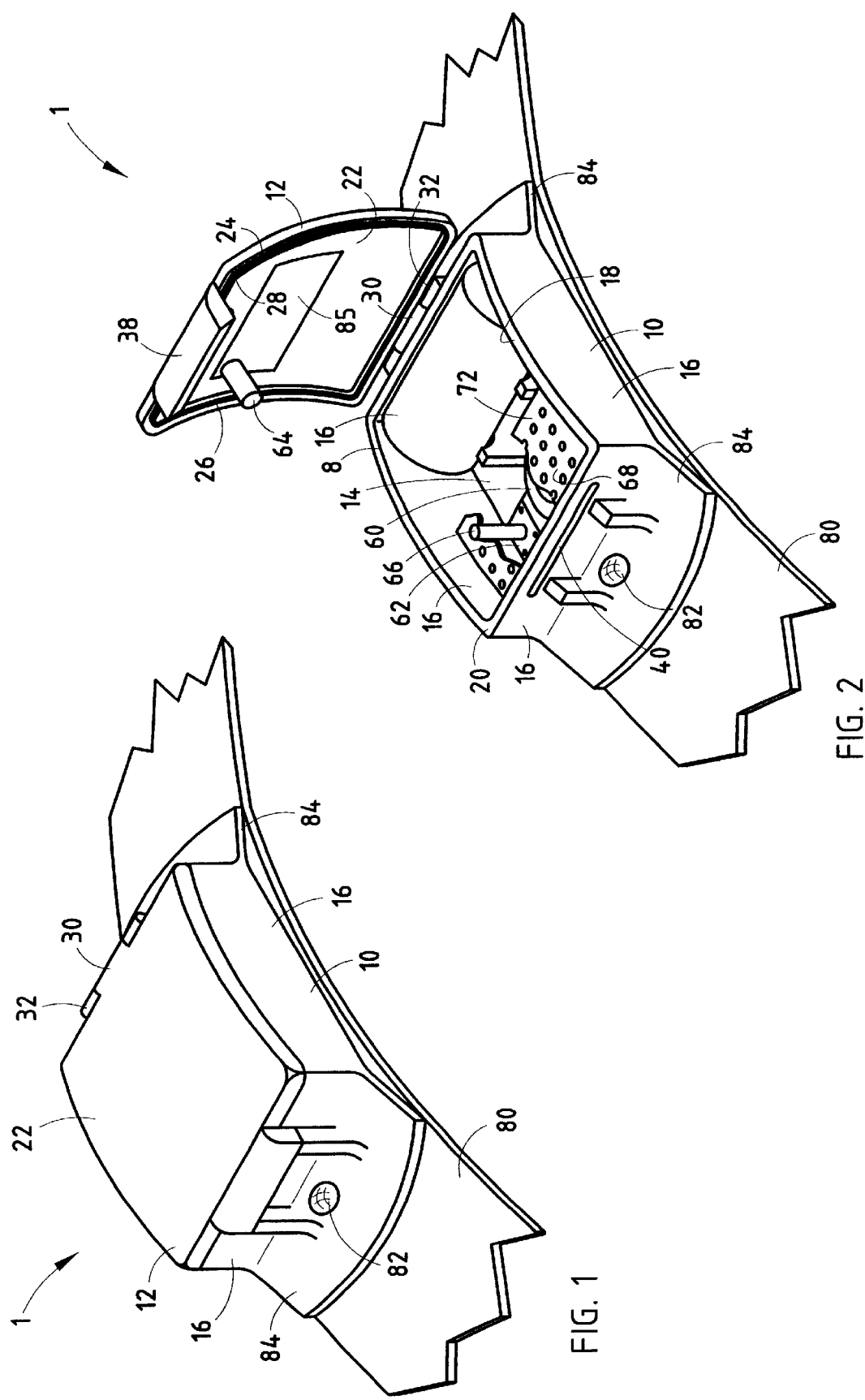

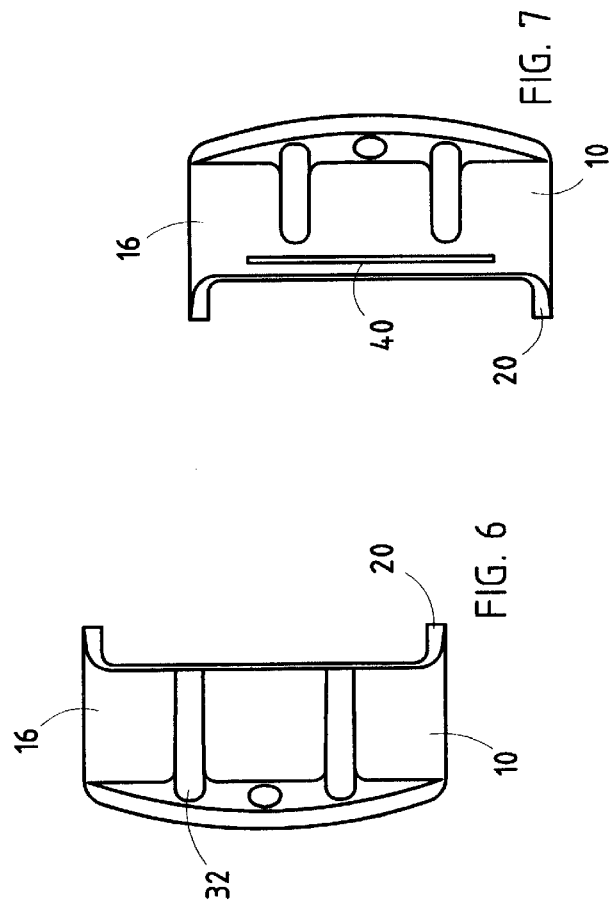
FIG. 7
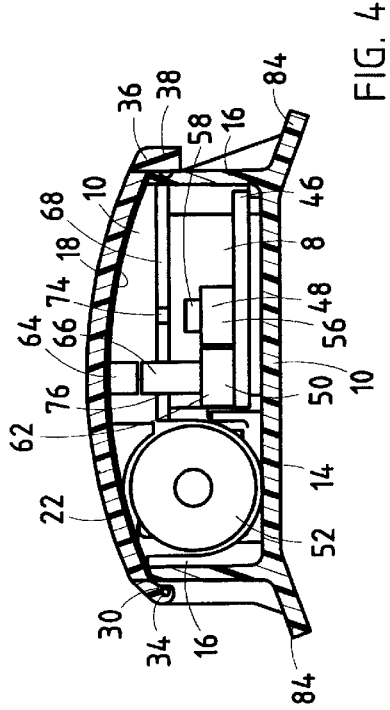
FIG. 4
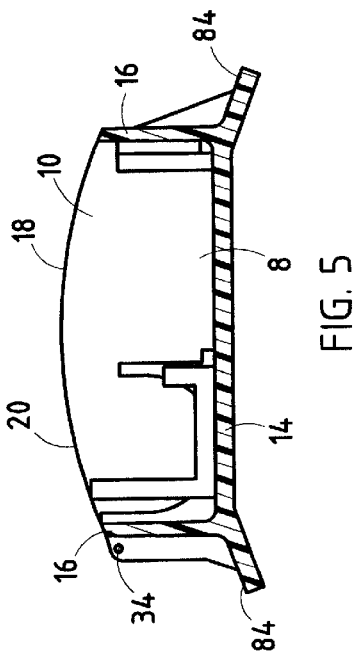
FIG. 6
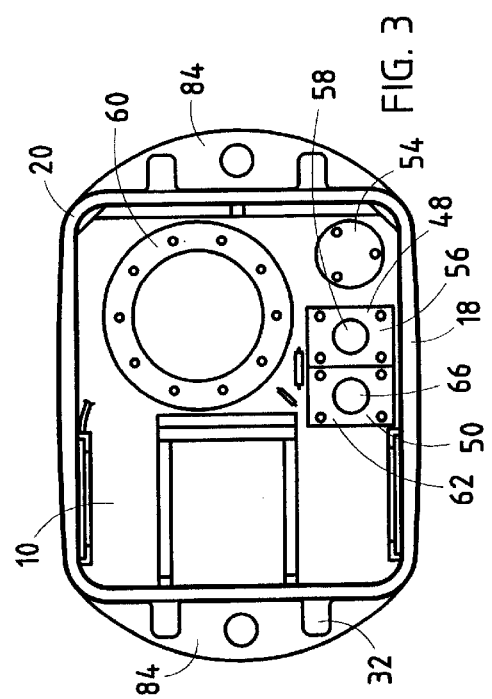
FIG. 3
FIG. 5

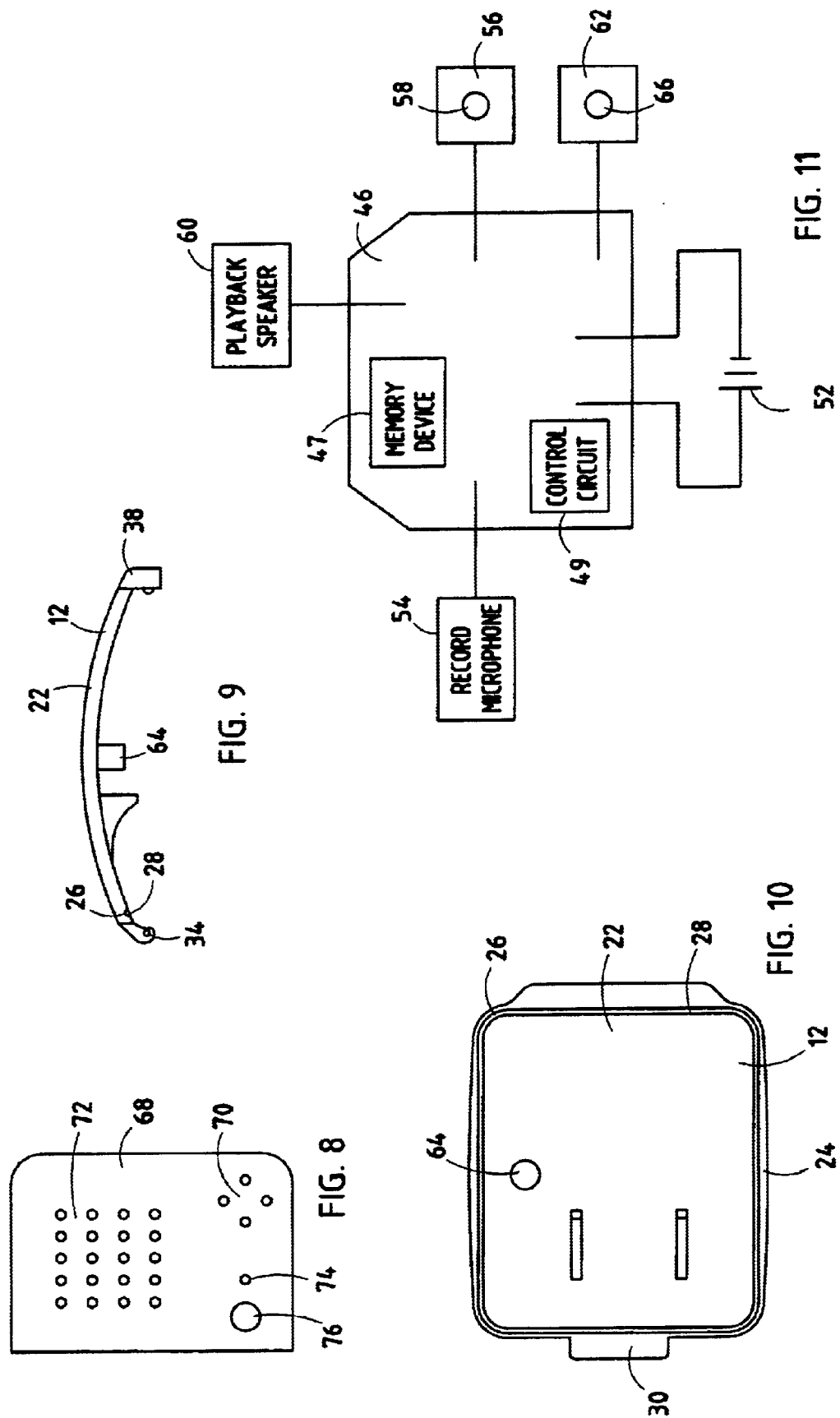

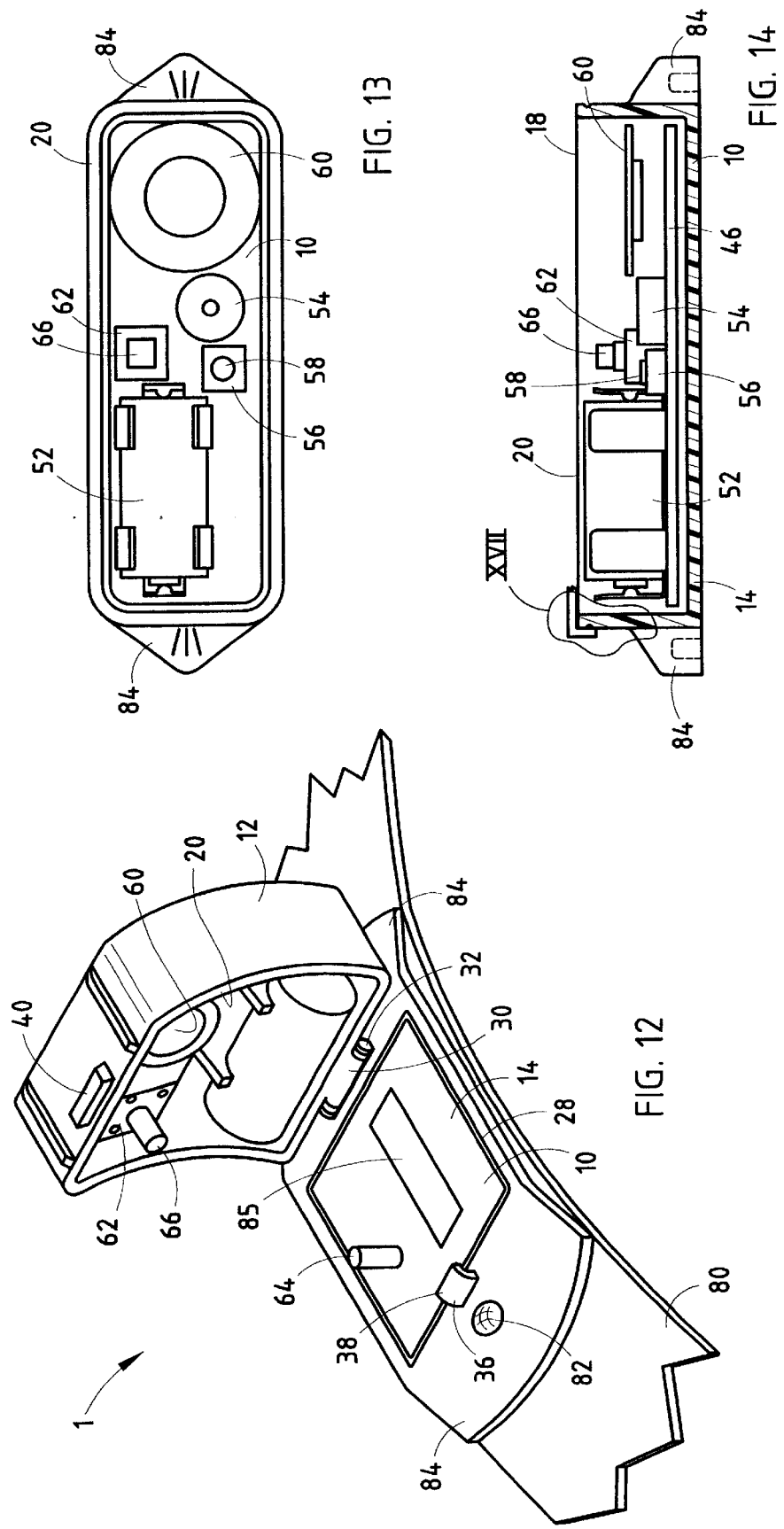

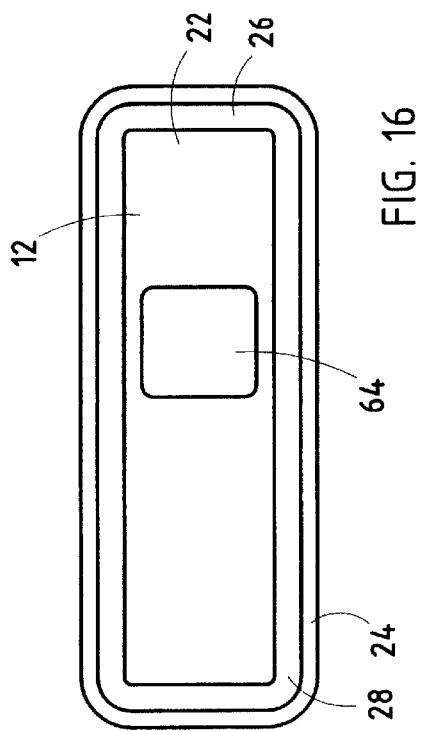
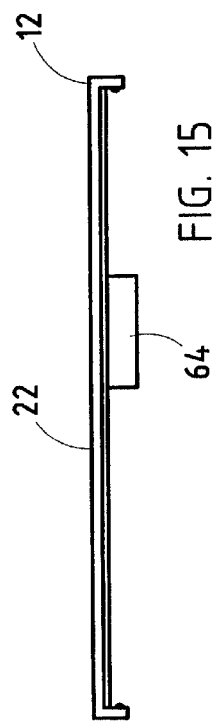
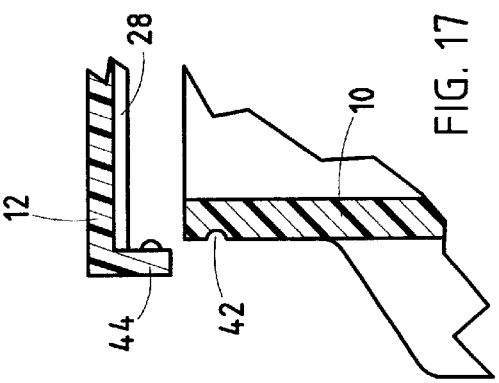

ELECTRONIC IDENTIFICATION SYSTEM

ELECTRONIC IDENTIFICATION SYSTEM

The present invention relates to a portable, self-contained identification system to be worn by a user and activated in the event that the user becomes lost, disoriented, or incapacitated. More particularly, the system of the present invention is directed to a system that is self-contained and completely protected from the environment and which automatically plays back a pre-recorded message when a removable lid is opened. The system of the present invention is also particularly adapted for use with a national registry system for the identification and retrieval of lost pets.

BACKGROUND OF THE INVENTION

Approaches toward identification systems have been long known in the art. The simplest of these are metal or plastic tags embossed or imprinted with identifying information, such as so-called "dog tags" worn by military personnel and tags attached to a collar around the neck of a pet, such as a dog or cat. The purpose and benefit of such simple systems are well-known and widely sought, in that individuals, as well as lost pets, that are injured, incapacitated, disoriented, or otherwise unable to identify themselves may be readily identified and returned to a proper custodian or otherwise appropriately relocated.

However, the aforementioned tags suffered disadvantages. The tags usually depended from a chain or collar, and tend to become caught or tangled on objects such as trees, bushes, and articles of clothing. In addition, such tags are subject to detachment under such circumstances, which entirely defeat their purpose. An additional shortcoming is damage to the tag, and possible obliteration of the identifying material.

Further solutions have not fully overcome these disadvantages. For example, U.S. Pat. No. 5,515,033 discloses a pet collar that also includes an inflatable balloon that activates in response to a coded radio signal. The device is exceedingly subject to puncture and, consequently, is reduced to merely a tag. U.S. Pat. Nos. 5,012,229, 5,337,041, 5,454,350, 5,955,953, 6,003,473, and 6,067,018 also disclose various approaches toward improvements in identification systems. However, none of these approaches fully protect the system from the harsh environments within which they must operate. U.S. Pat. No. 5,355,839 does disclose a weatherproof holder for a micro cassette tape attached to an animal collar. However, a separate playback device must be employed to retrieve an identification message. Thus, a fully self-contained and protected, and hence reliable, identification system was sought.

SUMMARY OF THE INVENTION

The aforementioned drawbacks and shortcomings of the prior art are elegantly solved with the identification system of the present invention, which provides a portable, self-contained system for recording an identifying message and subsequent playback of the message. The system comprises a base, a removable lid operatively and sealingly engageable with the base, whereby the removable lid and the base cooperate to form a sealed enclosure when the removable lid is engaged with the base. An attaching device is adapted to mount the system to the user, such as a pet animal, with a recording device for recording the message and a playback device for playing the message. Each of the recording device and playback device are housed within the enclosure, and a power supply is operatively connected with the recording device and the playback device. The recording device has a record microphone and a record switch and the playback device has a speaker and a playback switch. The recording switch is manually actuated to record the message and the playback switch is actuated by the depression and the release of the playback button, such that the playback switch is automatically actuated by removal of the removable lid to playback the message. The base of the portable, self-contained identification system mounted to a user is configured to substantially conform to the user. Preferably, the base has a bottom arcuate surface.

The removable lid further includes a hinge disposed on an edge thereof, whereby the hinge pivotally attaches the removable lid to the base. The base further comprises upwardly extending sidewalls defining an upper rim. The removable lid has an outer periphery corresponding to the upper rim of the base and a groove disposed about the outer periphery. The groove receives an annular seal for engaging the upper rim of the base. The wall opposite the hinge has a clasp retainer, and the removable lid further comprises a releasable clasp at an edge opposite the edge at which the hinge is disposed. The hinge and the releasable clasp cooperate with the clasp retainer to retain the removable lid in engagement with the upper rim of the base.

The removable lid has an external surface and an internal surface, with the internal surface having a playback switch actuator projecting into the enclosure and in cooperative relation with the playback switch button. The playback switch actuator depresses the playback switch button when the removable lid is engaged with the base and the playback switch actuator releases the playback switch button when the removable lid is not engaged with the base. The record switch is actuated by depression of a record switch button when the removable lid is not engaged with the base.

The portable, self contained identification system further comprises a circuit board mounted to the base within the enclosure. The recording device and the playback device are incorporated into and carried by the circuit board. The power supply is preferably a replaceable battery, but may include a solar cell.

The system of the present invention is also ideally suited for use with a national registry system. Upon acquiring the identification system of the present invention, the purchaser merely contacts a national registry service adapted for the purpose, and provides relevant information on the users of the system and contact information. When the playback switch is actuated, the message provided directs the finder of the system to the national registry service. The national registry service can then provide additional, detailed information on how to reunite the user of the system, such as a pet, with the purchaser of the system, such as an owner. Alternatively, the national registry service can take the finder's contact information and contact the purchaser so that contact can originate with the purchaser. In this way, the confidentiality of the purchaser may be fully maintained.

Other objects, advantages and features of the invention will become apparent upon a consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the construction and the arrangements set forth in the following description or illustrated in the drawings. The identification system of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers and practitioners in the art who are not familiar with the patent or legal terms of phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other objects, along with the various features and structures that characterize the invention, are pointed out with particularity in the claims annexed to and forming a part of this disclosure. For a better understanding of the identification system of the present disclosure, its advantages and the specific objects attained by its uses, reference should be had to the accompanying drawings and descriptive matter in which there are illustrated and described the preferred embodiments of the invention.

While embodiments of the identification system are herein illustrated and described, it is to be appreciated that various changes, rearrangements and modifications may be made therein, without departing from the scope of the invention as defined by the appended claims.

BRIEF DESCRIPTION OF THE DRAWINGS

FIG. 1 is a perspective view of a preferred embodiment of the identification system of the present invention in the closed, protected mode;

FIG. 2 is a perspective view of a preferred embodiment of the identification system of the present invention in the open, unprotected mode;

FIG. 3 is a plan view of the base of a preferred embodiment of the identification system of the present invention with the upper cover removed to expose the components carried therein;

FIG. 4 is a side cross-sectional view of a preferred embodiment of the identification system of the present invention;

FIG. 5 is a side cross-sectional view of a preferred embodiment of the base of the identification system of the present invention;

FIG. 6 is an end view of the base of a preferred embodiment of the identification system of the present invention;

FIG. 7 is an end view opposite that of FIG. 6 of the base of the identification system of the present invention;

FIG. 8 is a plan view of the cover of a preferred embodiment of the identification system of the present invention;

FIG. 9 is a side view of the removable lid of a preferred embodiment of the identification system of the present invention;

FIG. 10 is an inside plan view of a preferred embodiment of the identification system of the present invention;

FIG. 11 is a schematic circuit diagram for a preferred embodiment of the identification system of the present invention;

FIG. 12 is a perspective view of a second embodiment of the identification system of the present invention in the open, unprotected mode;

FIG. 13 is a plan view of the base of a third preferred embodiment of the identification system of the present invention;

FIG. 14 is a side cross-sectional view of the base of the identification system of the present invention;

FIG. 15 is a bottom view of the internal surface of the removable lid of the third embodiment of the identification system of the present invention;

FIG. 16 is a side cross-sectional view of the removable lid of the third embodiment of the identification system of the present invention;

FIG. 17 is a detailed cross-sectional view of the attachment of the third embodiment of the identification system of the present invention.

DETAILED DESCRIPTION OF PREFERRED EMBODIMENT

Figure 18:
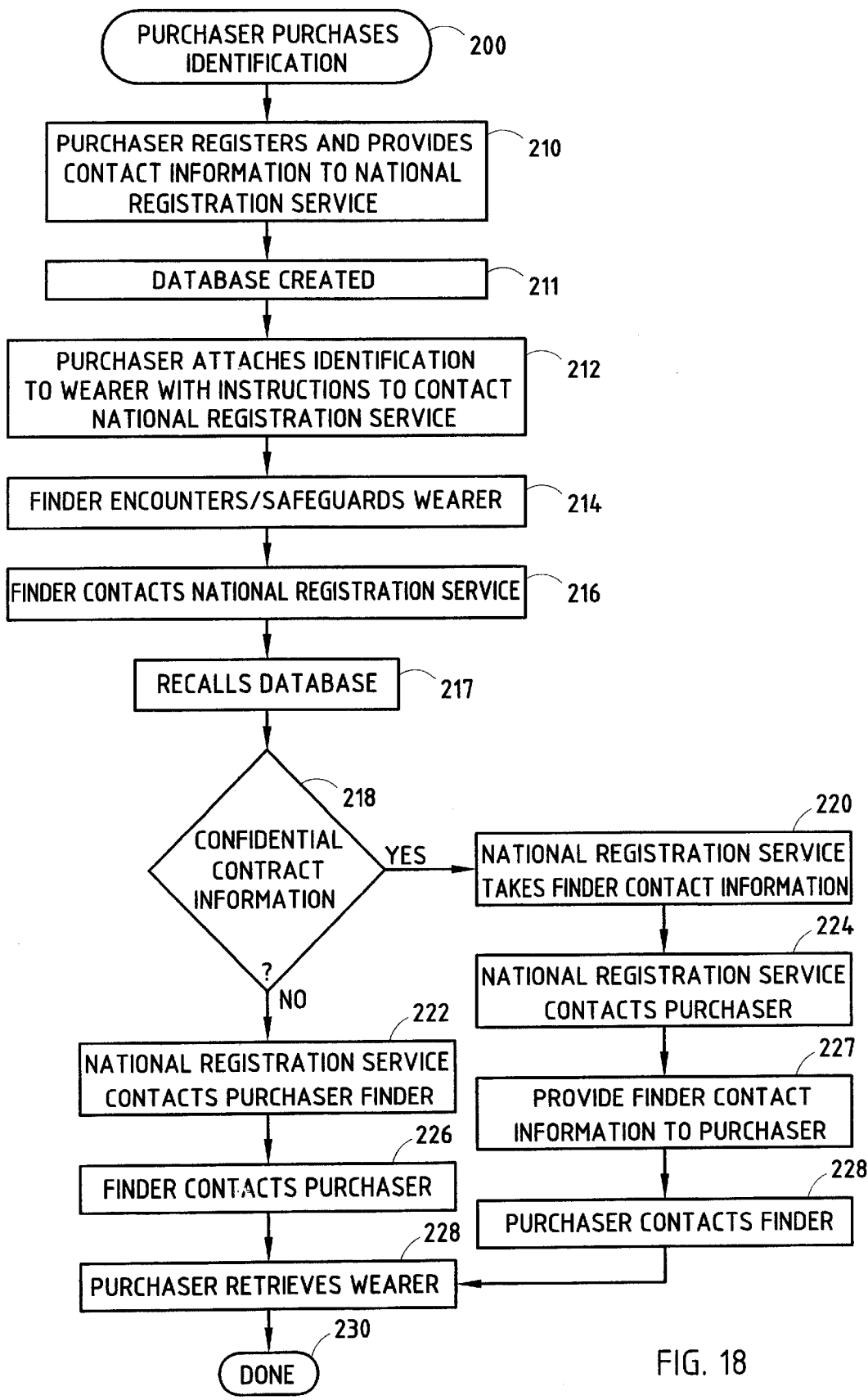
FIG. 18 is a detailed flowchart describing the method of the identification system of the present invention.

The best mode for carrying out the invention is presented in terms of the preferred embodiment, wherein similar reference characters designate corresponding features throughout the several figures of the drawings.

Referring now to the drawings, particularly FIG. 1, there is shown in perspective view the portable, self-contained identification system of the present invention. The identification system 1 consists primarily of a base 10 and a removable lid 12 in sealing engagement with the base 10, together forming a sealed enclosure 8 when the removable lid 12 is in sealing engagement with the base 10. The base 10 preferably includes a floor 14 and sidewalls 16 extending upwardly from the floor 14. As best shown in FIG. 2, two opposing sidewalls 16 preferably have an arcuate upper edge 18, as will be further discussed below. The upper edges of the sidewalls form an upper rim 20 about an open periphery of the base 10.

The removable lid 12 includes an arcuate-shaped covering 22 having an outer periphery 24 corresponding in shape and size to the upper rim 20 of the base 10. A groove 26 preferably extends about the outer periphery 24 of the removable lid 12, the groove 26 also corresponding to the upper rim 20 of the base 10. An annular seal 28, such as an O-ring, is disposed within the groove 26 such that the annular seal 28 cooperates with the upper rim 20 of the base to form a water-resistant seal for the enclosure 8 between the base 10 and the removable lid 12.

The removable lid 12 is preferred releasably in sealing relation with the base 10 by an interfitting hinge members 30 and 32 and hinge pin 34, as shown, situated respectively, on removable lid 12 and base 10 and a clasp assembly 36. The hinge member 30 is advantageously disposed at an edge of the outer periphery 24 of the removable lid 12, while the hinge member 32 is advantageously disposed on an upper portion of a sidewall 16 of the base 10, and provides for pivotal, permanent attachment of the removable lid 12 to the base 10. The clasp assembly 36 includes a releasable clasp 38 extending downwardly from the removable lid 12 and a fixed clasp retainer 40 disposed on at outer surface of a sidewall 16 opposite that to which is attached to the hinge member 32. The releasable clasp 38 cooperates with the clasp retainer 40 to securely retain the lid 12 in sealed relation with the base 10.

Preferably, the base 10 and removable lid 12 are injection molded of any relatively rigid, yet resilient, polymeric plastic material, such as polystyrene or polycarbonate plastics. Thus, the clasp 38 can be resiliently displaced to open the enclosure 8 when desired. It should be noted that other sidewall 16 configurations are possible, such as the rectangle shown in FIGS. 13–16. Also, it is fully contemplated that the sidewalls 16 may be curved, and may even form a circular enclosure 8 if desired. Likewise, it is contemplated that different colors may be used in the fabrication of the base 10 and removable lid 12. Indeed, the present invention contemplates that the removable lid 12 may be transparent or translucent to allow a view of the contents of the enclosure 8.

Furthermore, while hinge members 30 and 32 and clasp assembly 36 are preferably employed to obtain a releasable relation between the base 10 and removable lid 12, other attachment systems may be used, such as a detent 42 disposed about the outer sidewalls proximate the upper rim 20 of the base 10, with a corresponding clasp member 44 disposed about the outer periphery of the removable lid 12, the clasp member 44 engaging the detent 42 so as to maintain annular seal 28 in sealing engagement with the upper rim 20. In such an arrangement, shown in detail in FIG. 17, it is desired that a cord or other flexible attaching device be used to permanently couple the removable lid 12 to the base 10 so that the removable lid 12 cannot be lost.

As shown in the Figures and as an improvement over the art, the identification system 1 of the present invention is completely and sealing encased in the enclosure 8. The system further includes a circuit board 46 mounted to the floor 14 of the base, wherein a control circuit 49, a recording device 48, a memory device 47, a playback device 50, and a power source 52, such as a battery, are all operatively coupled to the circuit board 46. Although a battery is contemplated as preferred, solar cells or other electroactive sources can be used. The recording device includes a record microphone 54 and record switch 56 having record switch button 58. The playback device 50 includes a playback speaker 60 and playback switch 62. The removable lid 12 further has a playback switch actuator 64 depending from an internal surface in cooperative relation with a playback button 66 of the playback switch 62.

A cover 68 is situated above the recording device 48 and playback device 50, so as to protect the circuit board and components thereof when the removable lid 12 is opened. The cover 68 advantageously has openings 70 and 72 arranged above the recording microphone 54 and playback speaker 60, respectively. An access opening 74 in the cover 68 above the recording switch 56 also provides access to the record switch button 58 and preferably, is sized so that only a thin object, such as a paper clip, may be inserted therein to depress the recording switch button and activate the record switch 56. A larger access opening 76 is arranged above the playback switch 62 and through which the playback button switch 66 extends above the cover 68.

To operate the identification system 1, the removable lid 12 is removed to expose the enclosure 8. As the removable lid 12 is removed, the playback switch actuator 64 releases the playback switch button 66, allowing the playback switch 62 to open, signaling the circuit board 46 and control circuit 49 to play back a digitally recorded message stored on the memory device 47, such as a non-volatile memory, such as an EEPROM, through the playback speaker 60. A non-volatile memory is especially preferred if transient power sources, such as solar cells, are used. The message can be repeated by depressing and again releasing the playback switch button 66.

To record a new or different message, a paper clip or source other than object can be inserted into access opening 74 to depress record switch button 58. A short, preferably 60 second, audio message is then provided and recorded on the memory device 47. Of course, other play lengths, such as 20 and 40 seconds, can be provided. When the removable lid 12 is then closed, the playback switch actuator 64 depresses the playback switch button 66 to close the playback switch 62, signaling the circuit board 46 and control circuit 49 that the system 1 is ready to play back the message when the removable lid 12 is again removed.

In accordance with the present invention, it is apparent that a self-contained, portable audio identification system is provided, whereby the operative components, including the switches, microphones, and speakers, are sealing contained in a sealed enclosure, protected from the elements and largely impervious to damage. Only when operation of the unit is desired need the unit be opened, whereby the unit automatically begins to play back the prerecorded message.

As can be seen in FIGS. 1–11, the unit preferably assumes a generally arcuate shape and is attached to a collar 80 at tabs 84, such as those normally worn by pets, through rivets 82, although other fastening means, such as staples, hook and loop fasteners, stitching, etc. can be used. The arcuate shape allows the identification to substantially conform to the wearer of the unit to reduce to overall profile thereof and thereby generally contributing to the overall comfort of the wearer.

Another alternative embodiment is shown in FIG. 12, wherein like components are designated with like reference characters. In the alternative shown in FIG. 12, the base 10 and removable lid 12 are modified such that the electronic components are mounted in the removable lid 12. The removable lid 12 instead has sidewalls 16 and the base 12 is provided with the playback switch actuator 64. An annular seal 28 is disposed about the base 12 and engages the lower rim 20 of the removable lid 12. Hinge members 30 and 32 and clasp assembly 36 retain the removable lid 12 in sealing engagement with the base 10.

As shown in the Figures, it may be advantageous to include a label 85 or plate for providing written information as to the identity of the wearer. As shown in FIG. 2, this label can be disposed on the internal surface of the removable lid 12. Alternatively, as shown in FIG. 12, the label 85 can be disposed on the floor 14 of the base 12. In either approach, information can be written on the label, which is then affixed to the system 1. Since the label 85 is also disposed within the enclosure 8, the label 85 is also protected from the elements.

Another embodiment, again where like components are provided with like reference characters, may be seen in FIGS. 13–17, which discloses a base 10 and removable lid 12 that is elongated and generally rectangular. In the embodiment of FIGS. 13–15, the removable lid 12 is retained in place through a detent 42 and clasp member 44, instead of a hinge and clasp assembly. The playback switch 62, playback switch button 66, and playback switch actuator 64 are also shown as rectangular in shape.

As a further feature of the present invention, a method for implementing a national registry system is contemplated, as shown in FIG. 18. That is, purchasers of the identification system 1 may, after purchase of the system of the present invention at starting block 200, can subscribe to a national registration system to register the wearer of the identification system, such as a pet, and provide contact information at block 210. The contact information would include the name of the registrant, such as the pet owner, and relevant contact information, such as address, telephone, and email. Also, additional information regarding the wearer can be provided, such as name, temperament, and any special instructions, including medical conditions and food preferences. The contact information is then stored on a database by the national registry service at block 211. The purchaser then attaches the identification to the wearer, at block 212, with the identification having instructions to contact the national registry service.

When the wearer of the identification system becomes lost, any finder that encounters or safeguards the wearer at block 214 can be directed via the prerecorded audio message to call the national registry service. When the finder does contact the national registry service, at block 216, the service can then recall the contact information from the database at block 217. To preserve confidential information, the purchaser can specify that the contact information be maintained confidential. If so, at block 218, the national registry service can take the contact information of the finder at block 220. The national registry service then contacts the purchaser and provides the finder's contact information at block 224. The purchaser can contact the finder at block 227. Thus, the registrant or owner can determine the manner of retrieving the wearer, such as a pet, of the identification system of the present invention at block 228. Alternatively, if the purchaser's contact information is not confidential, at block 218, the finder is provided with this information at block 222. The finder can then contact the purchaser at block 226 and arrangements can be made to retrieve the wearer, such as a pet, at block 228. The cycle is then completed at block 230.

The solutions offered by the invention herein have thus been attained in an economical, practical, and facile manner. To wit, an effective and convenient portable self-contained identification system contains a fully protected playback device that automatically plays back a prerecorded message when opened. While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims and it is to be appreciated that various changes, rearrangements and modifications may be made therein, without departing from the scope of the invention as defined by the appended claims.

I claim the following:

1. A water-resistant portable, self-contained identification system for a user and for recording an identifying message and subsequent playback of the message, the system comprising:

a base shell having no external openings;

a removable lid shell having no external openings operatively and sealingly engageable with the base shell, the removable lid shell and the base shell cooperating to form a sealed enclosure when the removable lid is engaged with the base shell;

an attaching device adapted to mount the system to the user;

a recording device for recording the message, a memory storage device for storing the message, and a playback device for playing the message, each of the recording device, storage device, and playback device being housed within the enclosure; and a power supply operatively connected with the recording device and the playback device;

the recording device having a record microphone and a record switch and the playback device having a speaker and a playback switch;

wherein the recording switch is manually actuated to record the message and the playback switch is automatically actuated by removal of the removable lid shell to play back the message.

2. The portable, self-contained identification system of claim 1, wherein the system is attached to the user by the attaching device and the base is configured to substantially conform to the user.

3. The portable, self-contained identification system of claim 2, wherein the base has a bottom arcuate surface.

4. The portable, self-contained identification system of claim 1, wherein the removable lid further includes a hinge disposed on an edge thereof, the hinge pivotally attaching the removable lid to the base.

5. The portable, self-contained identification system of claim 4, wherein the base further comprises upwardly extending side walls defining an upper rim, one wall further having a clasp retainer, and the removable lid further comprises a releasable clasp at an edge opposite the edge at which the hinge is disposed, whereby the hinge and the releasable clasp in cooperation with the clasp retainer retains the removable lid in engagement with the upper rim of the base.

6. The portable, self-contained identification system of claim 5, wherein the removable lid has an outer periphery corresponding to the upper rim of the base and a groove disposed about the outer periphery, the groove receiving an annular seal for engaging the upper rim of the base.

7. The portable, self-contained identification system of claim 4, wherein the removable lid further comprises downwardly extending sidewalls defining a lower rim, one wall further having a clasp retainer, and the base further comprises a releasable clasp, whereby the hinge and the releasable clasp in cooperation with the clasp retainer retains the lower rim of the removable lid in engagement with the base.

8. The portable, self-contained identification system of claim 7, wherein the base has an outer periphery corresponding to the lower rim of the removable lid and a groove disposed about the outer periphery, the groove receiving an annular seal for engaging the lower rim of the removable lid.

9. The portable, self-contained identification system of claim 1, wherein the playback switch is actuated by the depression and release of a playback button, the removable lid further having an external surface and an internal surface, the internal surface further having a playback switch actuator projecting into the enclosure and in cooperative relation with the playback switch button, wherein the playback switch actuator depresses the playback switch button when the removable lid is engaged with the base and the playback switch actuator releases the playback switch button when the removable lid is not engaged with the base.

10. The portable, self-contained identification system of claim 9, wherein the power supply includes a solar cell, and the storage device is a non-volatile memory.

11. The portable, self-contained identification system of claim 1, wherein the record switch is actuated by depression of a record switch button when the removable lid is not engaged with the base.

12. The portable, self contained identification system of claim 1 further comprising a circuit board mounted to the base within the enclosure, wherein the recording device and playback device are incorporated into and carried by the circuit board.

13. The portable, self-contained identification system of claim 1, wherein the power supply is a replaceable battery.

14. The portable, self-contained identification system of claim 1, wherein the attaching device is a collar.

15. The portable, self-contained identification system of claim 1, wherein the enclosure further comprises a cover disposed above the recording device and the storage device, the playback device extending partially through the cover, the cover further comprising an access opening for providing access to the record switch.

16. A method for identifying a user through an audio message, the method comprising the steps of:

providing a sealable water-resistant enclosure comprising an upper and lower shell having a closed, protected mode and an open, unprotected mode, said upper and lower shell having no external openings;

disposing within the enclosure a circuit board having a memory storage device, a recording device, and a playback device, the recording device further comprising a recording switch and a microphone and the playback device further comprising a playback switch and a speaker;

providing the circuit board with a power supply;

recording the audio message by actuating the record switch when the enclosure is in the open, unprotected mode; and automatically playing back the audio message when the sealed enclosure is placed in the open, unprotected mode.

17. The method of claim 16, wherein the sealable enclosure has a removable lid and wherein removal of the removable lid performs the step of placing the sealed enclosure in the open, unprotected mode.

18. The method of claim 17, wherein the removable lid has an internal surface to which is attached a playback switch actuator projecting into the enclosure and in cooperative relation with the playback switch, wherein the playback switch actuator closes the playback switch when the sealable enclosure is in the closed, protected mode and the playback switch actuator opens the playback switch when the sealable enclosure is in the open, unprotected mode.

19. An identification system for a user for providing an audio message, the system comprising:

a sealable enclosure having a first closed, protected mode and a second open, exposed mode;

a circuit board comprising a digital memory device, a recording device having a record switch and a microphone, and a playback device having a playback switch and a speaker; and a power supply operatively connected with the circuit board;

wherein the audio message is recorded to the digital memory device when the recording switch is actuated and the audio message is automatically played back when the sealable enclosure is placed in the second mode.

20. The identification system of claim 19, wherein the audio message is played back when the sealable enclosure is in the second mode and after the playback switch is closed and opened.

* * * * *